United States Patent Office 3,493,093
Patented Feb. 3, 1970

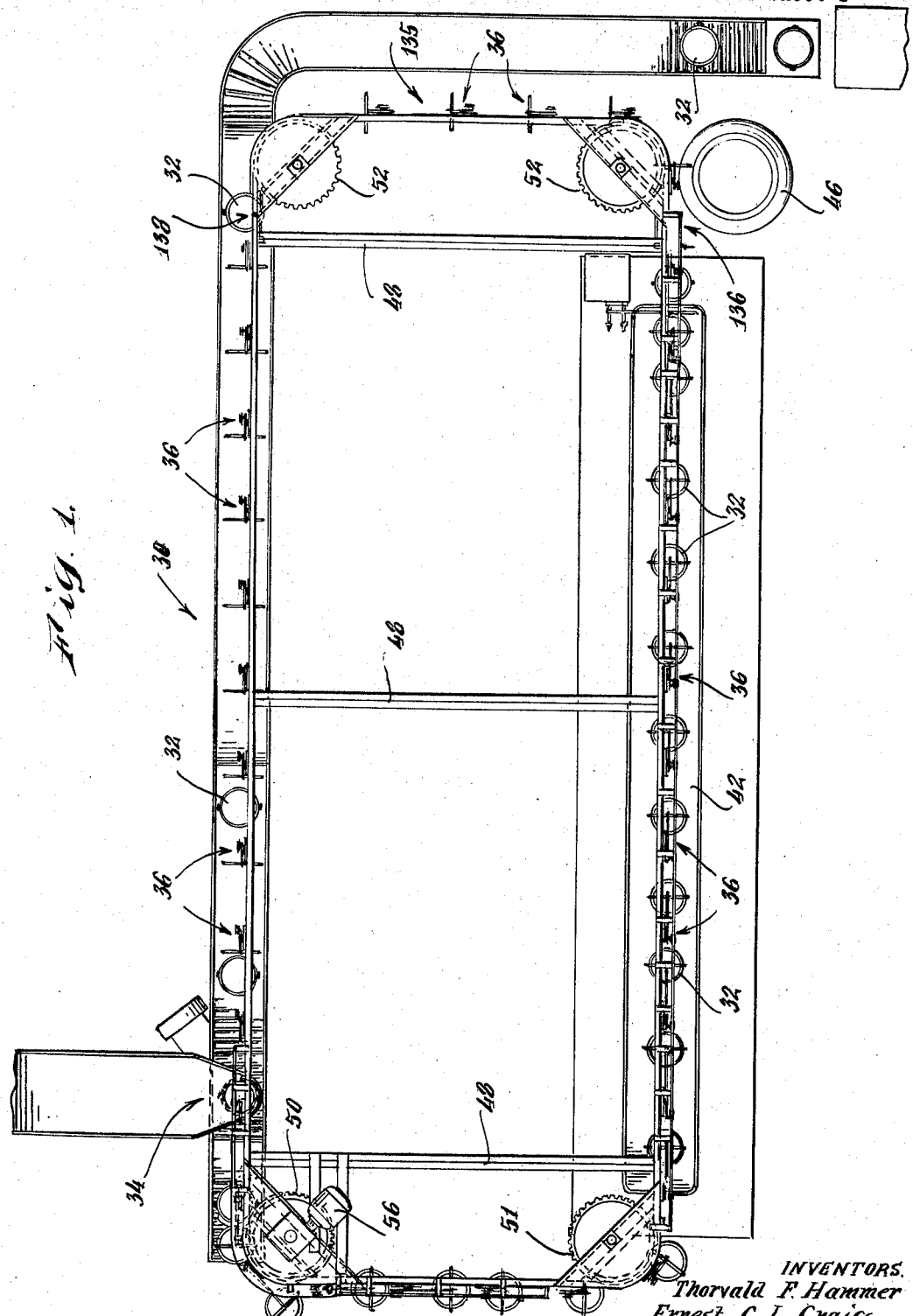

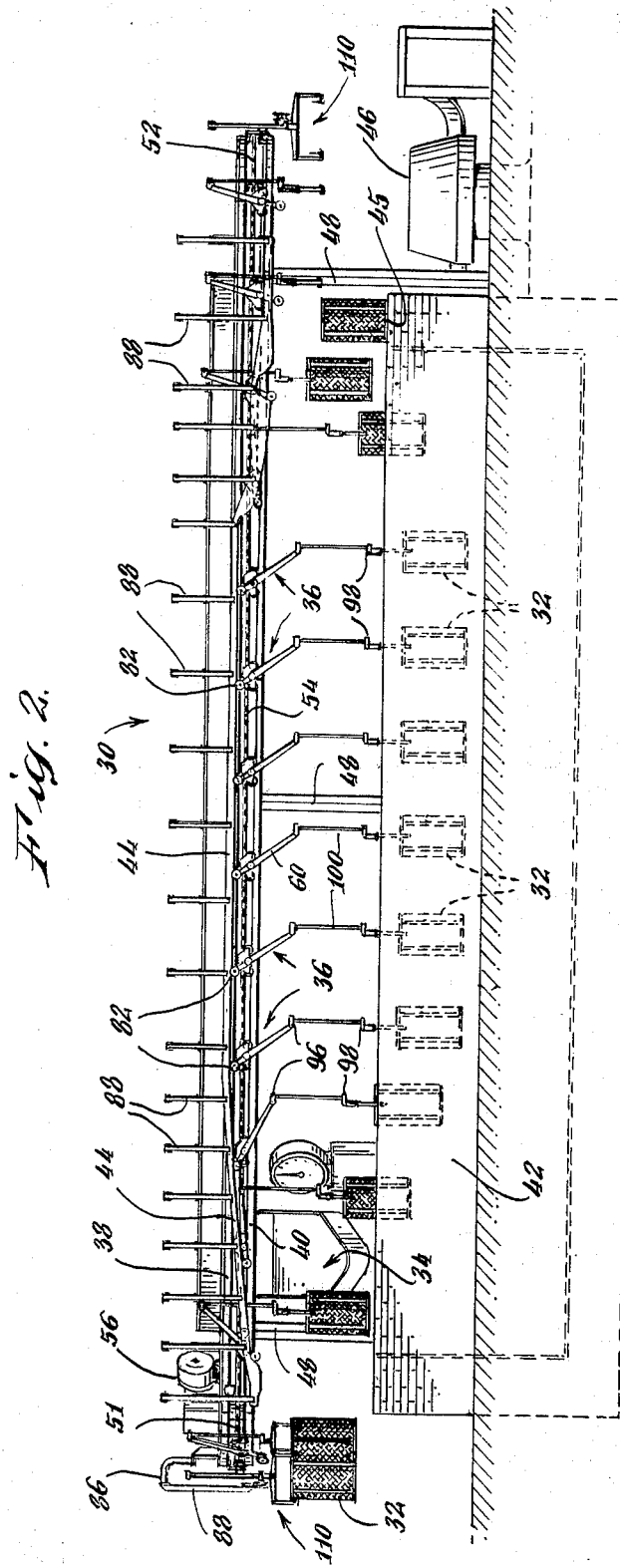

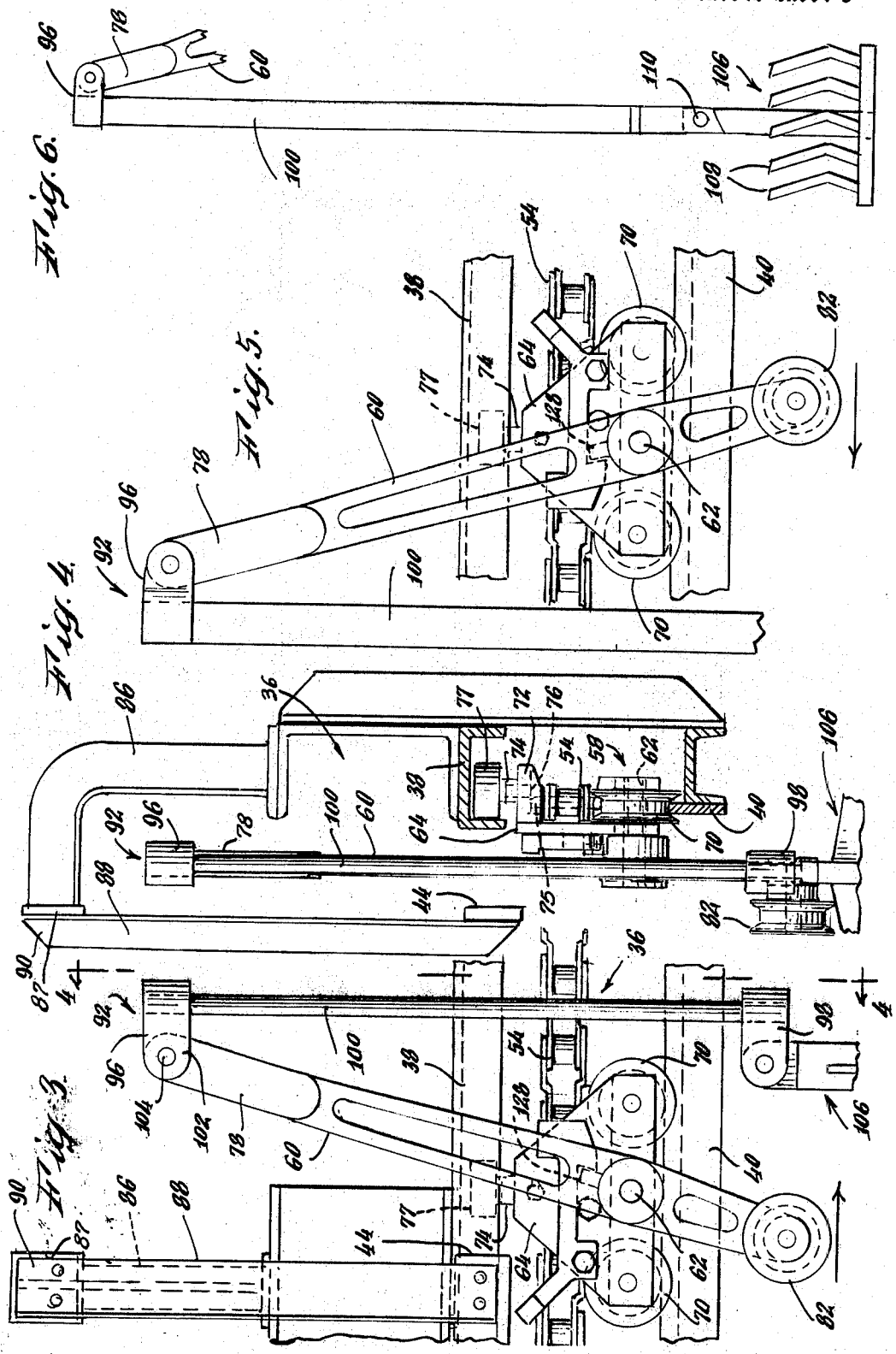

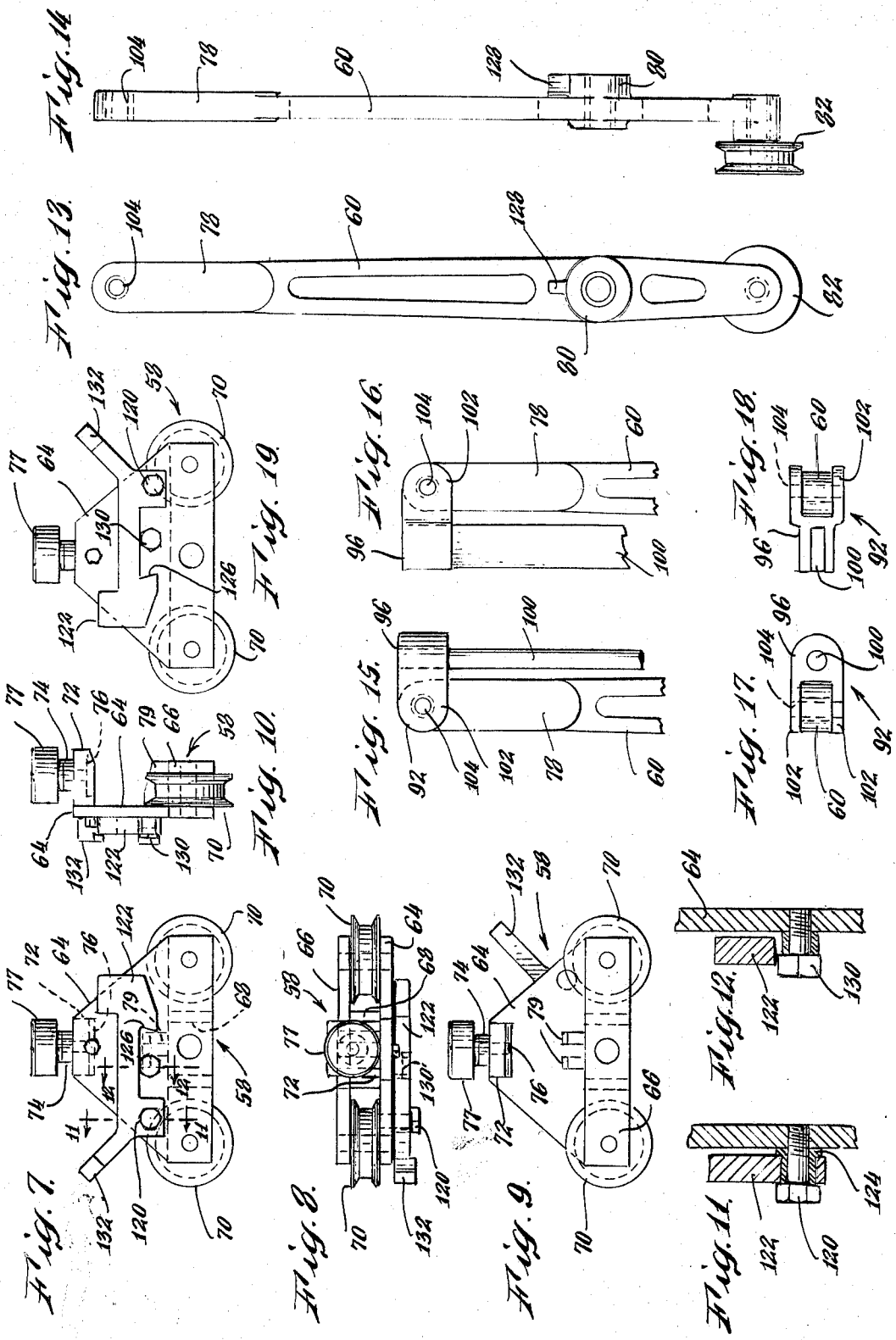

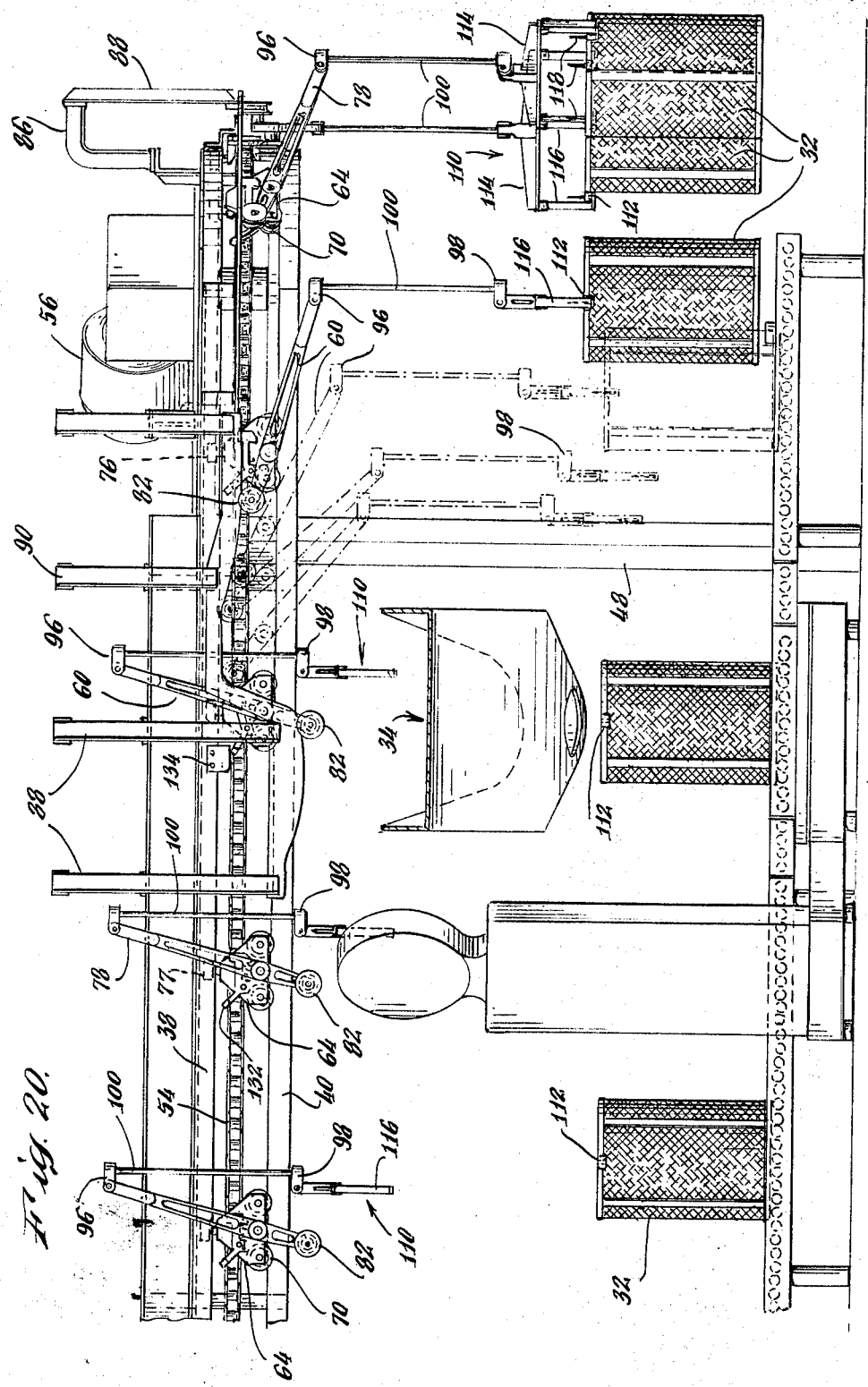

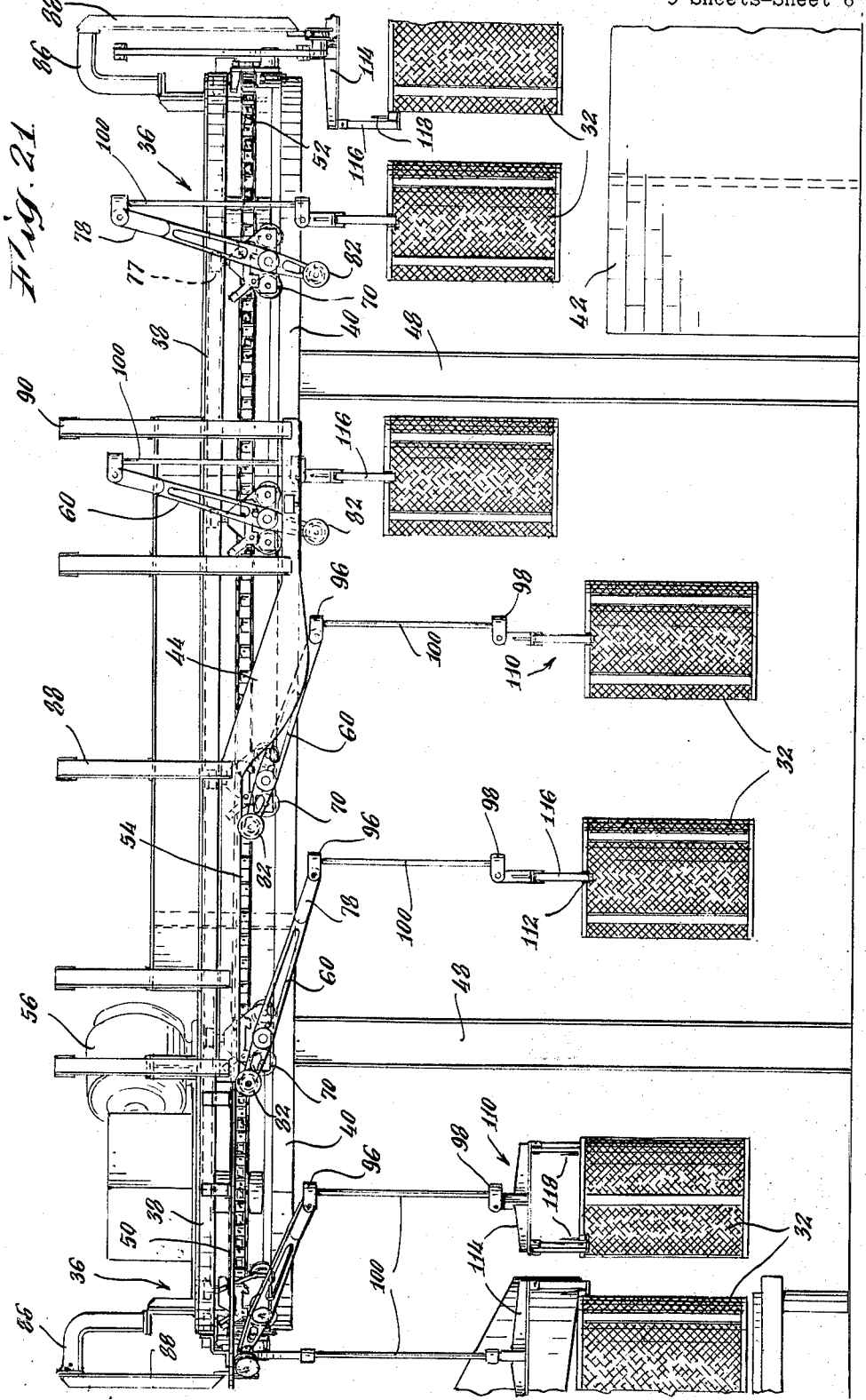

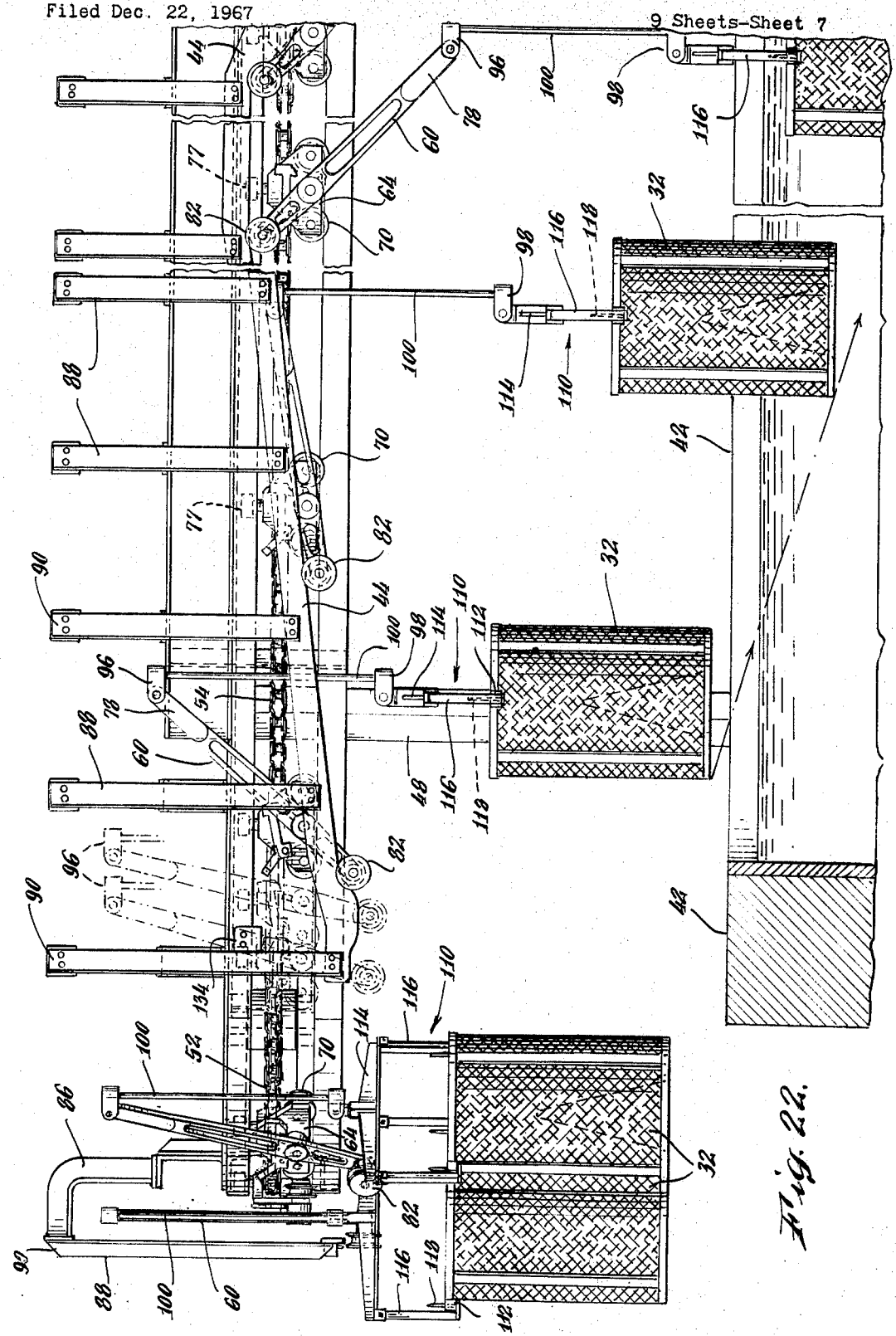

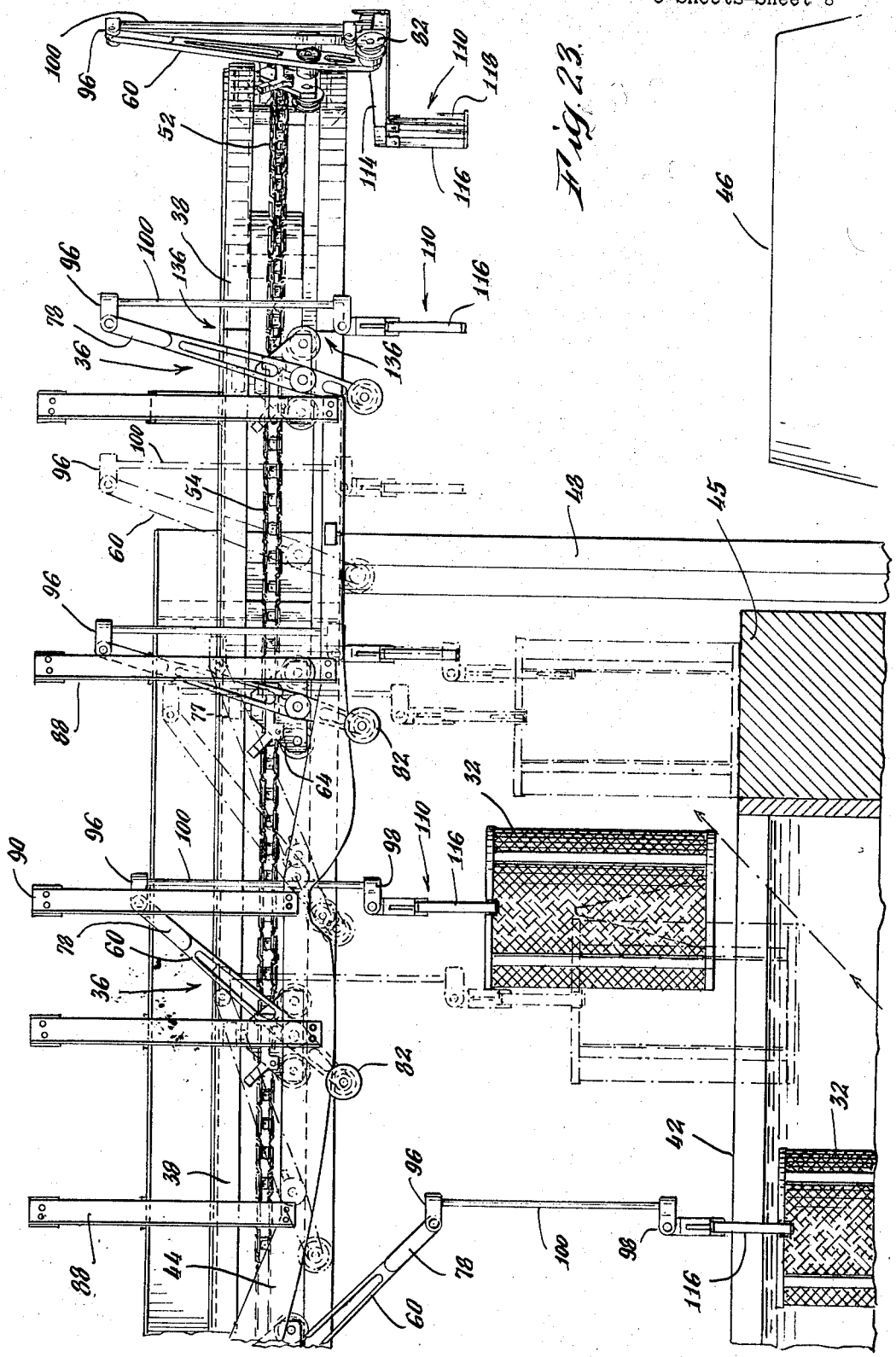

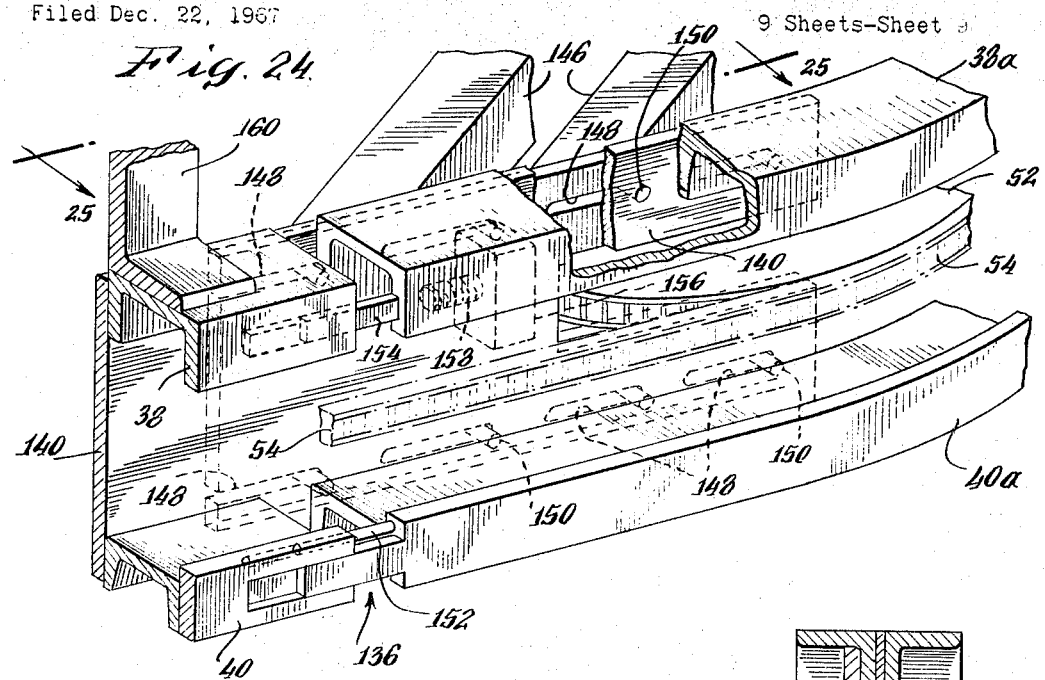
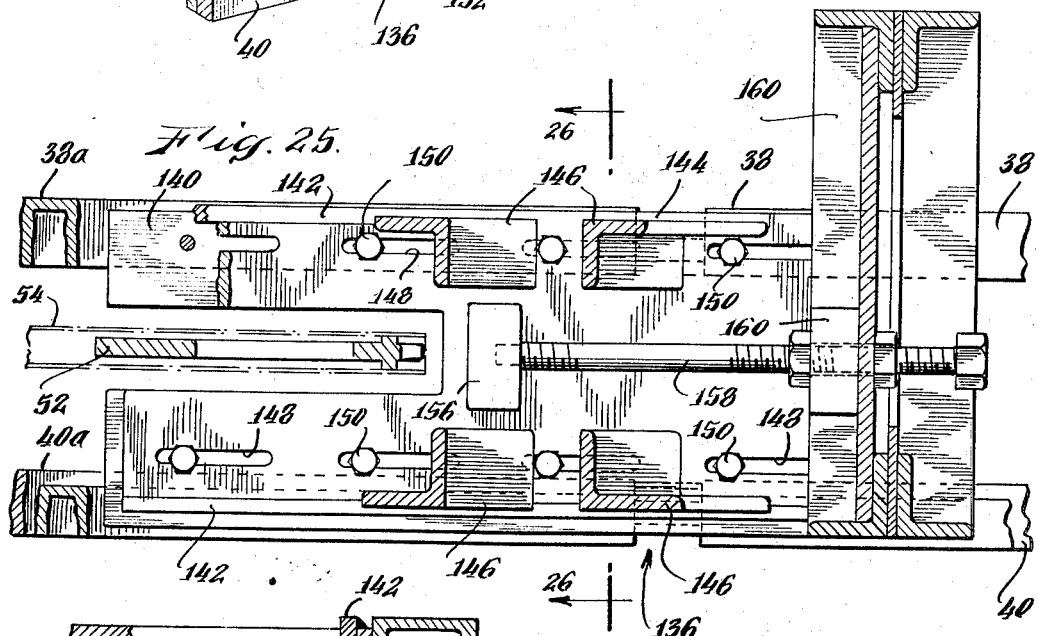
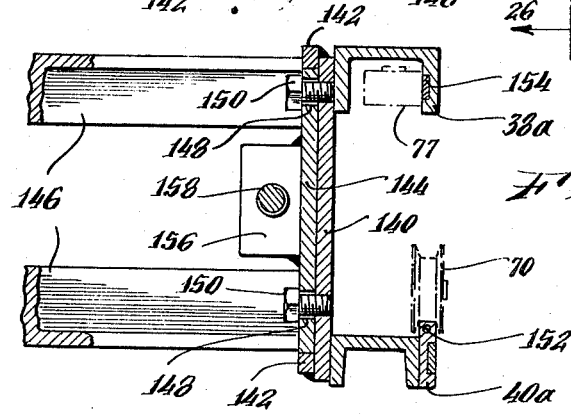

3,493,093
CONVEYOR APPARATUS
Thorvald F. Hammer and Ernest G. L. Craig, Branford, Conn., assignors to M.I.F. Industries, Incorporated, Branford, Conn.
Filed Dec. 22, 1967, Ser. No. 692,777
Int. Cl. B65g 47/22
U.S. Cl. 198—19                                            14 Claims

ABSTRACT OF THE DISCLOSURE

Conveyor apparatus for transporting materials from one location to another while varying the height of the material with respect to a horizontal reference level. A carriage is propelled along horizontal supporting tracks parallel to a first vertical plane containing a cam surface. A lever arm is pivotally mounted on the carriage and extends between the carriage and the cam surface, for movement in a second vertical plane parallel to the tracks. One end of the lever arm supports a load. A cam follower is mounted on the lever arm substantially in alignment with the pivotal point and the end supporting the load. The cam follower is positioned in the first plane for cooperation with the cam to rotate the lever arm and thus to control the height of the load with respect to the tracks.

---

The present invention relates to conveying apparatus for transporting a load from one location to another while varying the height of the load with respect to a horizontal reference level. More particularly, the invention relates to such apparatus wherein the movement of the load is controlled by a cam in a novel manner.

Cam-controlled conveyors are known in the art, as typified by Jenne Patent No. 2,537,931. In such known constructions, a carriage is propelled along horizontal tracks, and pivotally supports a bell crank having a load suspended from one end. A cam follower on the other end of the crank engages a cam fixedly mounted between the track and the crank, thus pivoting the crank and raising and lowering the load as the carriage moves along the track.

This known construction has certain limitations on flexibility. For example, the cam lower edge cannot be extended below the connection between the carriage and the bell crank. In addition, angular rotation of the bell crank must be restricted to prevent the cam follower from going over-center. Since space must be provided between the carriage and the bell crank for the cam and cam follower, the load is suspended in a plane a considerable distance from the track, resulting in a substantial torque being applied to the carriage.

It has been discovered that these and other limitations of known prior art conveyors can be avoided by positioning the lever arm between the cam and the carriage, and mounting the cam follower at a point on the lever arm substantially in alignment with the pivot point and the point at which the load is attached to the lever arm.

Accordingly, a primary object of the invention is to provide a novel cam-controlled conveyor.

A further object is to provide a conveyor of the above character wherein the lever arm supporting the load is pivotally mounted on a carriage moving along guiding and supporting tracks.

A further object is to provide a conveyor of the above character wherein the carriage is propelled along the tracks by a continuous chain.

A further object is to provide a conveyor of the above character wherein the chain is attached to the carriage at a point substantially directly above the lower track.

A further object is to provide a conveyor of the above character wherein the tension in the chain can be adjusted without disturbing the alignment of the chain with the tracks.

A further object is to provide a conveyor of the above character wherein the lever arm is mounted between the carriage and the cam.

A further object is to provide apparatus of the above character wherein the cam follower is mounted on the lever arm substantially aligned with the pivot point for the lever arm and the point in which the load is attached to the lever arm.

A further object is to provide a conveyor of the above character, including cooperating latching means mounted on the carriage and on the lever arm for latching the lever arm in a raised position.

A further object is to provide a conveyor of the above character comprising means for automatically releasing the latch at a desired location, whereby the position of the lever arm may be thereafter controlled by the cam.

A further object is to provide a conveyor of the above character, wherein the cam slightly raises the lever arm during the unlatching operation.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a plan view of an exemplary galvanizing apparatus employing the preferred conveyor according to the invention;

FIGURE 2 is a side elevation view of the FIGURE 1 apparatus, showing the general motion imparted to the load by the conveyor during the galvanizing operation;

FIGURE 3 is a side elevation view of the preferred carriage assembly according to the present invention;

FIGURE 4 is a sectional view taken along line 4—4 of FIGURE 3, illustrating the mounting of the cam in reaction to the carriage assembly;

FIGURE 5 is a side elevation view similar to FIGURE 3, showing a carriage assembly adapted for clockwise rotation;

FIGURE 6 is a side elevation view of an exemplary rack depending from the lever arm and supporting parts to be galvanized;

FIGURE 7 is a side elevation view of the preferred embodiment of the right side of the carriage of FIGURE 5;

FIGURE 8 is a plan view of the carriage shown in FIGURE 7;

FIGURE 9 is an elevation view of the left side of the carriage illustrated in FIGURE 7;

FIGURE 10 is a front elevation view of the carriage illustrated in FIGURE 7;

FIGURE 11 is a sectional view taken along line 11—11 in FIGURE 7;

FIGURE 12 is a sectional view taken along line 12—12 in FIGURE 7;

FIGURE 13 is an elevation view of the left side of the preferred lever arm which is to be mounted on the carriage of FIGURE 7;

FIGURE 14 is a front elevation view of the lever arm illustrated in FIGURE 13;

FIGURES 15 and 16 are elevation views of offset links for attaching loads to the end of the lever arm illustrated in FIGURES 13 and 14;

FIGURE 17 is an end view of the offset link illustrated in FIGURE 15;

FIGURE 18 is an end view of the offset link illustrated in FIGURE 16;

FIGURE 19 is an elevation view of the left side of a carriage adapted for counter-clockwise movement;

FIGURE 20 is an elevation view of the loading station in the FIGURE 1 apparatus;

FIGURE 21 is an elevation view of the drive end of the FIGURE 1 apparatus;

FIGURE 22 is an enlarged elevation view of the left portion of FIGURE 2, illustrating the movement of the load as it enters the galvanizing bath;

FIGURE 23 is an enlarged elevation view of the right end of the FIGURE 2 apparatus, illustrating the movement of the load as it leaves the galvanizing bath;

FIGURE 24 is a fragmentary front perspective view of the lower right corner of FIGURE 1, showing the means for adjusting chain tension;

FIGURE 25 is a rear elevation view of the apparatus shown in FIGURE 24; and

FIGURE 26 is a sectional view taken along line 26—26 in FIGURE 25.

Referring generally to FIGURES 1, 2, and 3, the conveyor 30 according to the invention is illustrated in a galvanizing operation. Empty baskets 32 are supplied to loading station 34 and filled with parts to be galvanized. Carriage assemblies 36, mounted for horizontal movement around a generally rectangular path defined by upper rail 38 and lower rail 40 (FIGURE 3), pick up the loaded baskets at loading station 34 and carry them around to galvanizing tank 42. Under control of cam 44 (FIGURE 2), carriage assemblies 36 next lower the baskets into tank 42, and then deposit the baskets of galvanized parts on a platform 45 before returning to loading station 34 to pick up other baskets. The baskets 32 placed on platform 45 may be removed by a non-illustrated hoist to centrifuge 46, to remove excess zinc.

As illustrated in FIGURE 1, conveyor 30 is supported by suitable frame members on vertical pillars 48. Drive sprocket 50 and idler sprockets 51 and 52 (FIGURE 1) are journalled in the frame for rotation in a horizontal plane, and are positioned at the corners of a rectangle. An endless chain 54 (FIGURES 2 and 3) is mounted on sprockets 50 and 52 for driving carriage assemblies 36, as will be explained.

Motor 56 is mounted on the frame, and rotates sprocket 50 to drive chain 54 in the counter-clockwise direction as viewed in FIGURE 1. As best shown in FIGURE 3, rail 38 is positioned above and parallel to the generally rectangular path of chain 54, including the regions where chain 54 contacts sprockets 50 and 52, while rail 40 is similarly positioned below and parallel to the path of chain 54.

As shown in FIGURES 3 and 4, carriage assemblies 36 according to the present invention are mounted on rails 38 and 40 and propelled by chain 54. Each carriage assembly 36 includes a carriage 58 having a lever arm 60 pivotally mounted thereon by pivot pin 62 for movement in a vertical plane parallel to rails 38 and 40.

The preferred form of carriage 58 is shown in FIGURES 3, 4, and 7–12. Carriage 58 includes parallel side frame members 64 and 66 joined by transverse crosspieces 68. Tandem flanged wheels 70 are journalled between the ends of frame members 64 and 66, and support carriage 58 for movement along lower rail 40.

Frame member 64 extends upwardly nearly to the lower edge of upper rail 38 (FIGURE 4). Bracket 72 extends horizontally from the upper left edge of frame member 64, and supports vertical shaft 74. Roller 77 is rotatably mounted on shaft 74, for rolling contact with the left or inner surface of upper rail 38 (FIGURE 4). Thus, carriage 58 is primarily supported by wheels 70 rolling on lower rail 40, and is maintained in the upright position by the cooperation of roller 77 and upper rail 38.

Carriage 58 is coupled to chain 54 by means of a vertical pin 75 mounted on chain 54 in vertical alignment with the track 40. The upper end of pin 75 is received in a lateral slot 76 formed in the lower surface of bracket 72; while the lower end of pin 75 is received in lateral slot defined by tabs 79 attached to the carriage frame members.

The preferred construction of lever arm 60 is illustrated in FIGURES 13 and 14. As shown therein, arm 60 is a simple straight lever and includes a load-carrying end 78 provided with a horizontal axis pivot pin 104 a horizontal axis pivot hub 80 and a horizontal axis cam follower roller 82 positioned in the plane defined by the axis of pin 104 and the axis of hub 80 i.e., the axis of the roller 82 lies in a straight line intersecting the axis of the hub 80 and the axis of the pin 104. Cam follower 82, which is illustrated as a flanged roller, is offset outwardly of the vertical plane in which arm 60 pivots, to engage cam 44.

Cam 44 is mounted outboard of lever arm 60, as best illustrated in FIGURES 3 and 4. A right angle bracket 86 is supported on a suitable frame member, and extends upwardly sufficiently high to clear end 78 when arm 60 is in a vertical or nearly vertical position. Bracket 86 next extends outwardly and terminates in an end 87 above and outwardly of arm 60. A vertical bracket 88 has its upper end 90 attached to end 87, and extends downwardly therefrom to support cam 44 in a vertical plane parallel to and outwardly of the plane in which arm 60 pivots. Cam follower 82 is positioned in the plane of cam 44 and rides against the contoured lower surface of the cam to control the angular orientation of arm 60 with respect to the horizontal plane in which carriage 75 moves.

Although lever arm 60 has been disclosed as a simple lever wherein cam follower 82 is mounted on the opposite side of hub 80 from load-carrying end 78, the principal advantages of the invention may be obtained if cam follower 82 is mounted on the right side of arm 60 at a point between hub 80 and end 78. In this case, cam 44 should be positioned below cam follower 82, and the cam contour will be complementary to the contour illustrated.

The load is suspended from end 78 of arm 60 by link 92 illustrated in FIGURES 3, 4, 15 and 17. Link 92 includes identical offset yokes 96 and 98 rigidly connected by vertical rod 100 of circular cross section, which may be of any desired length. The parallel ends 102 of yoke 96 extend rearwardly on opposite sides of end 78, and are pivotally attached thereto by transverse pin 104. The mechanism 106 for supporting the load is similarly pivotally mounted on yoke 98, which is offset so that the load is suspended directly beneath pin 104 and in the vertical plane in which arm 60 pivots. This construction of link 92 permits arm 60 to be nearly vertical without interference with link 92. An alternative construction for link 92 is illustrated in FIGURES 5, 6, 16 and 18, wherein the vertical rod 100 is of rectangular cross section.

As shown in FIGURE 6, the load-carrying mechanism 106 may be in the form of a rack having upstanding fingers 108 for supporting parts to be treated. Mechanism 106 can be directly mounted on the lower end of rod 100 by a pivot pin 109 if desired.

When the load is transported in baskets 32 rather than on a rack, the load-carrying mechanism suspended from link 92 may be in the form of yoke 110 illustrated in FIGURE 22, wherein baskets 32 include opposed lips 112 extending radially outwardly from their upper edges. Yoke 110 includes a transverse crossarm 114 having its central portion pivotally suspended from yoke 98. Depending arms 116 are attached to opposite ends of crossarm 114. The lower ends of arms 116 are directed inwardly and terminate in upwardly directed fingers 118 which are spaced for insertion in matching apertures extending vertically through lips 112.

Further according to the invention, latching means are provided for latching arm 60 with end 78 in a raised position as shown at the left of FIGURE 20. This permits elimination of portions of cam 44 when vertical movement of the load is not required. The preferred form of latch is illustrated in FIGURES 7, 11, 12, 13 and 14. The latching means includes bolt 120 mounted on and extending outwardly of carriage frame member 64 (FIGURES 7 and 11). Latch plate 122 has its lower rear portion pivotally mounted on bushing 124 supported on bolt 120, and extends forwardly parallel to and along the outer side of carriage frame member 64. The lower edge of latch plate 122 is relieved to form detent 126. A rib 128 is formed on the hub 80 at the inner side of lever arm 60 at the correct radius from hub 80 (FIGURES 13 and 14) for cooperation with detent 126 when end 78 is raised to a particular angle, for example, 15 degrees below the vertical. Latch stop 130 (FIGURES 7 and 12) extends from the outer side of carriage frame member 64, to support latch plate 122 in the horizontal position.

Means are also provided for unlatching lever arm 60. The upper rear corner of latch plate 122 is provided with an upwardly and rearwardly extending ear 132, as shown in FIGURE 7. A cooperating stationary cam plate 134 (FIGURE 20) is mounted on the outer side of upper rail 38 at an appropriate location, and extends downwardly sufficiently far to engage ear 132. When carriage 58 passes cam plate 134, ear 132 engages cam plate 134, pivoting latch plate 122 in the counter-clockwise direction (as viewed in FIGURE 20) sufficiently to release rib 128 from detent 126.

According to another aspect of the invention, novel means are provided for adjusting the tension of chain 54. In the prior art as typified by the above-noted Jenne patent, a small idler sprocket at one corner of the apparatus was movably mounted for adjusting the chain tension, while the upper and lower rails were fixed. This contsruction caused misalignment of the chain with respect to the rails with resulting difficulties in proper tracking of the carriage along the rails in this portion of the conveyor. These difficulties are avoided by the construction illustrated in FIGURES 1, 23, 24 and 25, wherein the two idler sprockets 52 shown at the right of FIGURE 1, are mounted on an integral subframe 135 connected at joints 136 and 138 to the conveyor, and movable with respect thereto. Joints 136 and 138 are mirror images, and accordingly only joint 136 will be described with reference to FIGURES 24-26.

The main frame of the apparatus includes a fixed, vertical horizontally extending plate 140 (FIGURES 24-26) abutting the left edges of rails 38 and 40, and spanning joint 136, for adjsutably supporting subframe 135. Horizontal gibs 142 are mounted near the upper and lower edges of fixed plate 140, to guide subframe 135 as will be explained.

Subframe 135 includes a vertical, horizontally extending mounting plate 144 adjustably positioned alongside fixed plate 140 and between gibs 142. Diagonal braces 146, in which sprockets 52 are journalled, rigidly join mounting plate 144 to rail segments 38a and 40a, which extend from joint 136 to joint 138. The ends of rail segments 38a and 40a are aligned with and form continuations of rails 38 and 40, as best shown in FIGURE 24. Both movable plate 144 and fixed plate 140 are slotted to span the periphery of sprocket 52. Movable plate 144 is provided with horizontally elongated slots 148. Bolts 150 extend through slots 148 and are threaded into fixed plate 140. Accordingly, the entire subframe 135 including rail segments 38a and 40a, sprockets 52, plates 144, and diagonal braces 146 can be slidably adjusted along the left side of plate 140 and clamped into position by bolts 150. Gibs 142 maintain subframe 135 in horizontal alignment during the adjustment.

The gap between the fixed rails and the adjustable rail segments can be spanned in a number of ways, one of which is shown in FIGURES 24 and 26. The end of rail 40 is provided with an axial bore near its upper edge, to slidably receive an aligned mating pin 152 attached to the end of rail segment 40a. Similarly, the surface of rail 38 along which roller 75 rolls is provided with an axial groove, for slidably receiving a mating tongue 154 mounted on the end of rail segment 38a. Accordingly, carriage 58 is supported by pin 152 and tongue 154 as it crosses the joint.

A preferred means for moving subframe 135 with respect to the main frame is shown in FIGURES 25 and 26, wherein a block 156 is anchored to the left side of movable plate 144. A bolt 158 is rigidly attached to block 156 and extends horizontally parallel to plate 144 through an aperture in a fixed frame member 160. Nuts 162 are threaded on bolt 158 from opposite sides of frame member 160, to permit adjustment of subframe 135 when bolts 150 are loosened.

It may be seen that the alignment of chain 54 with rail segments 38a and 40a is not disturbed by the adjustment for chain tension. This permits chain 54 to continue to apply its force to carriage 58 in a line substantially directly above flanged wheels 70, resulting in smoother tracking of the carriage and less strain on the chain and carriage.

Operation of the apparatus can be briefly summarized with reference to the drawings. Referring to FIGURE 20, carriage assemblies 36 are seen approaching loading station 34 from the left, with lever arms 60 latched in the raised position. As carriage assembly 36 reaches the left end of cam 44, cam follower 82 engages the surface of cam 44, slightly raising arm 60 to relieve the pressure on the latch assembly and facilitate release of the latch. Ear 132 is then engaged by cam plate 134, pivoting latch plate 122 and releasing rib 128 (FIGURE 13) from detent 126 (FIGURE 7). As carriage assembly 36 continues to move to the right, as viewed in FIGURE 20, arm 60 with yoke 110 is lowered under the control of cam 44 until fingers 118 are directly beneath the apertures in lips 112 on loaded baskets 32. At this point, arm 60 is pivoted upward, lifting basket 32 as carriage 36 continues around the corner.

As shown in FIGURE 21, arm 60 and basket 32 are lifted by cam 44 sufficiently high to latch arm 60 in its upward position again. As carriage 36 continues around the second corner of the apparatus, as shown in FIGURE 22, cam follower 82 encounters another section of cam 44 and a second cam plate 134, which cooperate to unlatch arm 60 and lower it under control of the cam, whereupon arm 60 lowers basket 32 into galvanizing tank 42. Carriage assembly 36 continues to move to the right until it approaches the end of tank 42 with basket 32 immersed in the galvanizing bath. As basket 32 approaches the end of tank 42 (FIGURE 23), it is lifted out of the tank and deposited on platform 45, with yoke 110 continuing to lower sufficiently to free fingers 118 from the apertures in lips 112. After fingers 118 have cleared lips 112, cam 44 again raises arm 60 sufficiently high to engage the latch. Carriage 60 then continues on around to loading station 34 to pick up another load basket 32.

The outboard mounting of cam 44 permits several advantages to be obtained, as compared to the prior art typified by the Jenne patent noted above. Lever arm 60 can be rotated through nearly twice the angular distance under the control of cam 44, permitting a shorter, lighter, and more rigid construction of the lever arm while attaining the same vertical movement of the load. This permits the apparatus to be lower and require less overhead clearance than if a bell-crank lever arm were used.

Since clearance need not be provided between lever arm 60 and carriage frame member 64 for the cam and cam follower, the plane in which lever arm 60 pivots can be closer to rails 38 and 40, reducing the torque load which must be resisted by roller 77 and rail 38.

Pivot pin 62, on which lever arm 60 is mounted, may be attached to carriage 36 in the plane defined by the shafts of flanged wheels 70, thus simplifying and lightening the carriage. The point at which chain 54 is attached to carriage 58 is much nearer the pivot point of lever arm 60, reducing the torque applied to the carriage.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Conveyor apparatus comprising:
   (A) a generally horizontal track;
   (B) a carriage mounted on said track for movement therealong;
   (C) a fixedly mounted cam having a cam surface in a first vertical plane at one side of and in laterally spaced parallel relation to said track;
   (D) pivot means on said carriage having a horizontal pivot axis extending laterally above said track and from said carriage toward said first vertical plane; and
   (E) a straight lever arm pivotally mounted on said pivot means for pivotal movement about said horizontal pivot axis in a second vertical plane in the space between said track and said first vertical plane and parallel to said first vertical plane, said lever arm having:
      (1) a work-carrying member pivotally mounted on one end for pivotal movement about a horizontal axis, and
      (2) a cam follower roller mounted on said lever arm for rotation about a horizontal axis lying in a straight line intersecting the pivotal axes of said lever arm and said work-carrying member, said cam follower roller being positioned within said first vertical plane for cooperation with said cam surface.

2. The conveyor apparatus defined in claim 1, wherein the pivot axis of said lever arm is intermediate its ends, and wherein the pivot axis of said work-carrying member is at one end and the rotational axis of said cam follower roller is at the other end.

3. The conveyor apparatus defined in claim 1, further comprising cooperating latching means mounted on said carriage and on said lever arm for latching said lever arm with said one end higher than said pivot axis of said lever arm.

4. The conveyor apparatus defined in claim 3, further comprising releasing means mounted on said frame for releasing said latching means when said carriage passes said releasing means.

5. The conveyor apparatus defined in claim 4, wherein said cam is contoured to slightly raise said first end when said latching means is being released.

6. The conveyor apparatus defined in claim 1, wherein said carriage is propelled along said tracks by an endless chain positioned directly above and in centralized vertically aligned relation to said track.

7. The conveyor apparatus defined in claim 6, wherein said chain is attached to said carriage at a point substantially vertically aligned with said pivot axis of said lever arm.

8. The conveyor apparatus defined in claim 1, wherein said carriage is supported on said tracks by wheels, and wherein said pivot axis of said lever arm lies substantially in the plane defined by the axes of said wheels.

9. The conveyor apparatus defined in claim 6 wherein said endless chain is driven along a substantially rectangular path about a driven sprocket and three idler sprockets mounted within a horizontal plane.

10. The conveyor apparatus defined in claim 9, wherein two adjacent idler sprockets are mounted on a subframe movable with respect to the driven sprocket and the remaining idler sprocket, for adjustment of chain tension.

11. The conveyor apparatus defined in claim 10, wherein said subframe includes track segments movable therewith and along which said carriage is supported as said carriage moves, whereby alignment of said chain and said track segments is unchanged during adjustment of said subframe.

12. Conveyor apparatus, comprising:
   (A) a main frame rotatably supporting first and second sprockets;
   (B) a subframe supporting third and fourth sprockets;
   (C) said sprockets being arranged at the corners of a rectangle for rotation in a first horizontal plane;
   (D) an endless chain mounted on said sprockets and defining a generally rectangular path tangent to and connecting said sprockets;
   (E) a fixed track mounted on said main frame and conforming in vertically aligned relation to the three sides of said rectangular path tangent to said first and second sprockets with one side of said track extending continuously between said first and second sprockets and the other two sides terminating short of said third and fourth sprockets; a track segment mounted on said subframe and conforming in vertically aligned relation to the remainder of said rectangular path, said track segment and said fixed track forming a substantially continuous path for supporting said carriage moving therealong;
   (F) and means for adjusting said subframe, whereby the tension in said chain can be adjusted without affecting alignment of said chain and said path.

13. The conveyor apparatus defined in claim 12, further comprising means for spanning the variable gap between the ends of said track and said track segment.

14. The conveyor apparatus defined in claim 12, further comprising cooperating guide means on said main frame and on said subframe for guiding said subframe when said subframe is adjusted.

References Cited
UNITED STATES PATENTS

| | | | |
|---|---|---|---|
| 2,219,724 | 10/1940 | Quick | 198—181 |
| 2,537,931 | 1/1951 | Jenne | 118—425 |
| 2,716,479 | 8/1955 | Coder | 198—19 |

RICHARD E. AEGERTER, Primary Examiner

U.S. Cl. X.R.

118—425; 134—75